(12) United States Patent  (10) Patent No.: US 7,416,038 B2
Etzler et al.  (45) Date of Patent: Aug. 26, 2008

(54) TUBULAR HINGE BAR

(75) Inventors: Floyd A. Etzler, Convoy, OH (US); Jerry J. Connett, Fort Wayne, IN (US)

(73) Assignee: International Truck Intellectual PRoperty Company, LLC, Warrenville, IL (US)

( * ) Notice: Subject to any disclaimer, the term of this patent is extended or adjusted under 35 U.S.C. 154(b) by 431 days.

(21) Appl. No.: 11/051,925

(22) Filed: Feb. 4, 2005

(65) Prior Publication Data

US 2006/0175104 A1   Aug. 10, 2006

(51) Int. Cl.
    *B62D 25/12* (2006.01)
(52) U.S. Cl. .................. 180/69.2; 180/69.21; 180/89.17
(58) Field of Classification Search ............. 180/69.21, 180/89.14, 89.16, 89.15, 89.17, 69.2; 296/27, 296/190, 35.1
    See application file for complete search history.

(56) References Cited

U.S. PATENT DOCUMENTS

| | | | | |
|---|---|---|---|---|
| 2,864,121 | A | * 12/1958 | Imber et al. ................... | 16/308 |
| 3,982,600 | A | * 9/1976 | Gerresheim et al. ....... | 180/69.21 |
| 4,708,389 | A | * 11/1987 | Maebayashi et al. ... | 296/107.12 |
| 4,829,409 | A | * 5/1989 | Funkey ....................... | 362/496 |
| 4,850,444 | A | * 7/1989 | Bojanowski et al. ........ | 180/68.1 |
| 5,123,695 | A | * 6/1992 | Kanemitsu et al. ..... | 296/193.09 |
| 5,215,157 | A | * 6/1993 | Teich ....................... | 180/69.24 |
| 5,435,406 | A | * 7/1995 | Gaffoglio et al. ......... | 180/69.21 |
| 5,499,690 | A | * 3/1996 | Shearn et al. .............. | 180/68.4 |
| 5,890,556 | A |  4/1999 | Shearn et al. | |
| 6,058,903 | A | * 5/2000 | Downham ............... | 123/198 E |
| 6,314,615 | B1 | * 11/2001 | Wolda ......................... | 16/367 |
| 6,454,035 | B1 |  9/2002 | Waskow et al. | |
| 6,637,531 | B2 |  10/2003 | Palenchar et al. | |
| 6,719,354 | B2 | * 4/2004 | Holt ....................... | 296/146.11 |
| 6,846,038 | B1 | * 1/2005 | White et al. ........... | 296/193.11 |

* cited by examiner

*Primary Examiner*—Christopher Ellis
*Assistant Examiner*—Bridget Avery
(74) *Attorney, Agent, or Firm*—Jeffrey P. Calfa; Gerald W. Askew

(57) ABSTRACT

A hinge bar for the hinge assembly of a large motor vehicle's hood has a body with opposite ends, arms, curved end sections connecting the arms to the body at each end and hinge bar brackets extending from the arms. At least one ring is located between the midsection of the body and one of the opposite ends.

5 Claims, 8 Drawing Sheets

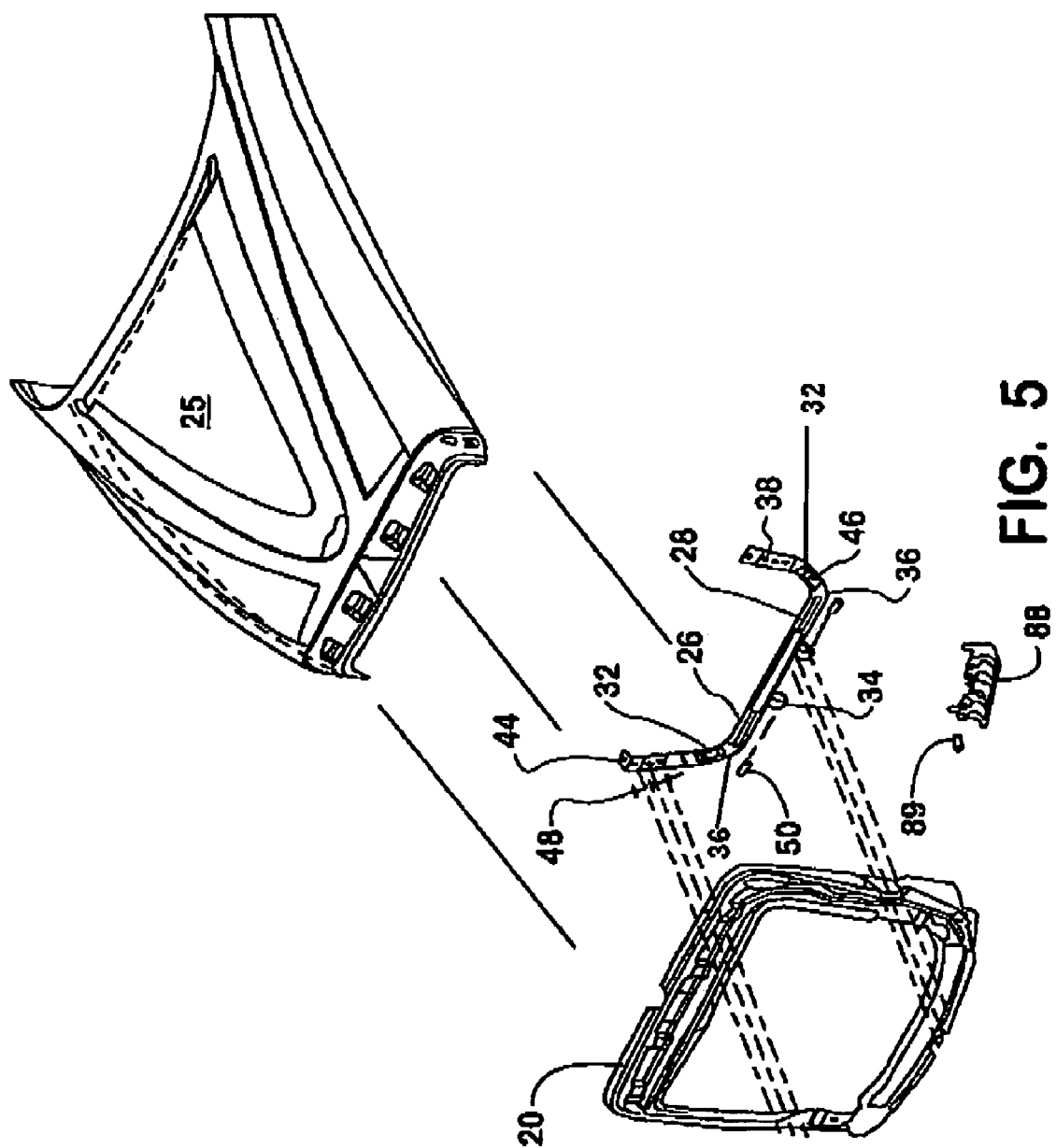

TUBULAR HINGE BAR

BACKGROUND OF THE INVENTION

1. Field of the Invention

The present invention relates to a hinge bar used in the hinge assembly of a large forward tilt hood found on large motor vehicles, such as trucks and school buses.

2. Description of the Prior Art

Large motor vehicles, such as trucks and school buses, have large, bulky and heavy hoods attached to their cabs. A truck hood, for example, may weigh 150 pounds or more and can be difficult for a driver to lift without substantial effort on the part of the operator to open and close the hood.

The hoods are typically fastened at the front of the chassis using a front hood hinge and to the back of the cab using brackets. In many designs, the bulky hood opens to a vertical position by pivoting forward on the front hood hinge. The front hood hinge assembly must therefore support the weight of the heavy hood in the open position, while allowing the hood to pivot forward. One part of the hood hinge assembly is a hinge bar.

The prior art hinge bar shown in FIG. 11 has a number of problems. The hinge bar 126 has a straight rectangular body 128. A flat triangular bracket 130 abuts and fastens to the side at each end. The triangular brackets 130 in turn are used to fasten the hinge bar 126 to the right and left sides of a front reinforcement assembly. Circular rings fasten to the straight body. All parts must be carefully aligned or else the hinge bar will not fit the hood or the rest of the hinge assembly.

This straight design, however, does not work well for modern streamlined hoods. The modern hood and cab design is streamlined and curved, not only for aesthetics but also for reducing the drag on the vehicle to increase fuel economy. The streamlined design leaves less room under the hood.

The design of the hinge bar's straight body and triangular brackets does not allow a smooth fit into a curved front of the hood, if at all. If the curvature of the front end of the hood changes, the prior art hinge bar cannot easily accommodate the new design.

In addition, the prior art hinge bar has seven different parts that must be assembled by a worker. Assembling all these parts reduces efficiency and increases the chance of assembly error.

Therefore, there is a need for a hinge bar that will fit the streamlined, curved designs of the hood. In addition, the hinge bar should be easier to accurately assemble and to support other parts attached to it. The hinge bar should easily adapt to design changes in the hood and cab.

SUMMARY OF THE INVENTION

According to the invention there is provided a hinge bar for use on large forward tilt hoods of motor vehicles, such as trucks and school buses. The hoods are pivotally mounted to the vehicle frame on a horizontal axis adjacent the front bumper. The pivotal mount encompasses the hinge and a hinge bar.

The hinge bar has a body with a midsection and opposite ends. A curved end section extends from one end and is located between an arm and the body. A hinge bar bracket extends from the arm opposite the end section. At least one ring is located between the midsection and one of the opposite ends.

The hinge bar mounts to a front reinforcement assembly for the hood and pivotally mounts to the hinge. The front reinforcement assembly attaches to the front and sides of the hood.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a perspective exploded view of an embodiment of a hinge bar of the invention, the front hood reinforcement assembly and the top of the hood;

DETAILED DESCRIPTION OF THE INVENTION

Figure 1:
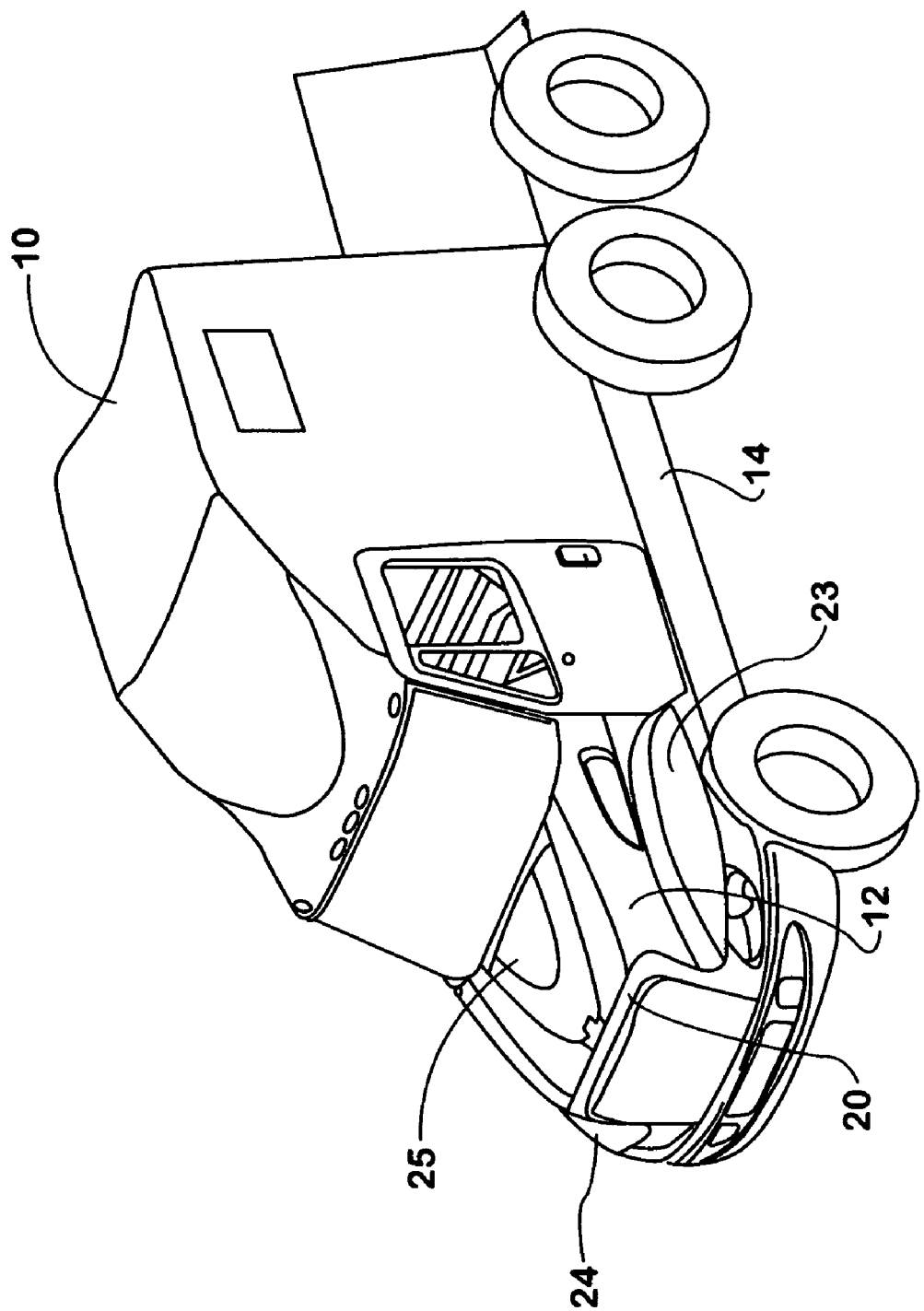
FIG. 1 is a perspective view of a motor vehicle in which the invention is used.
Figure 3:
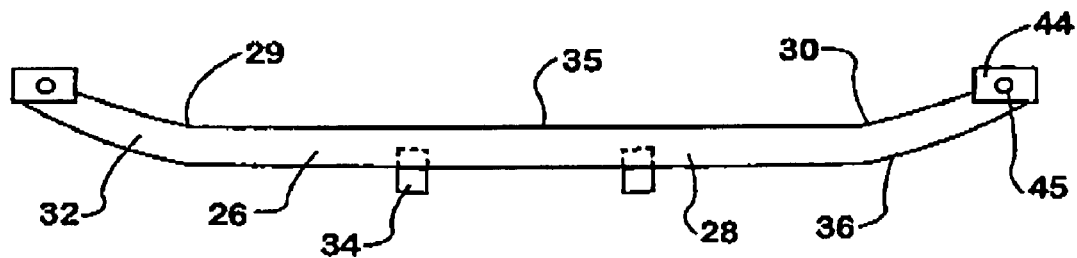
FIG. 3 is top perspective view of an embodiment of a hinge bar of the invention.
Figure 2:
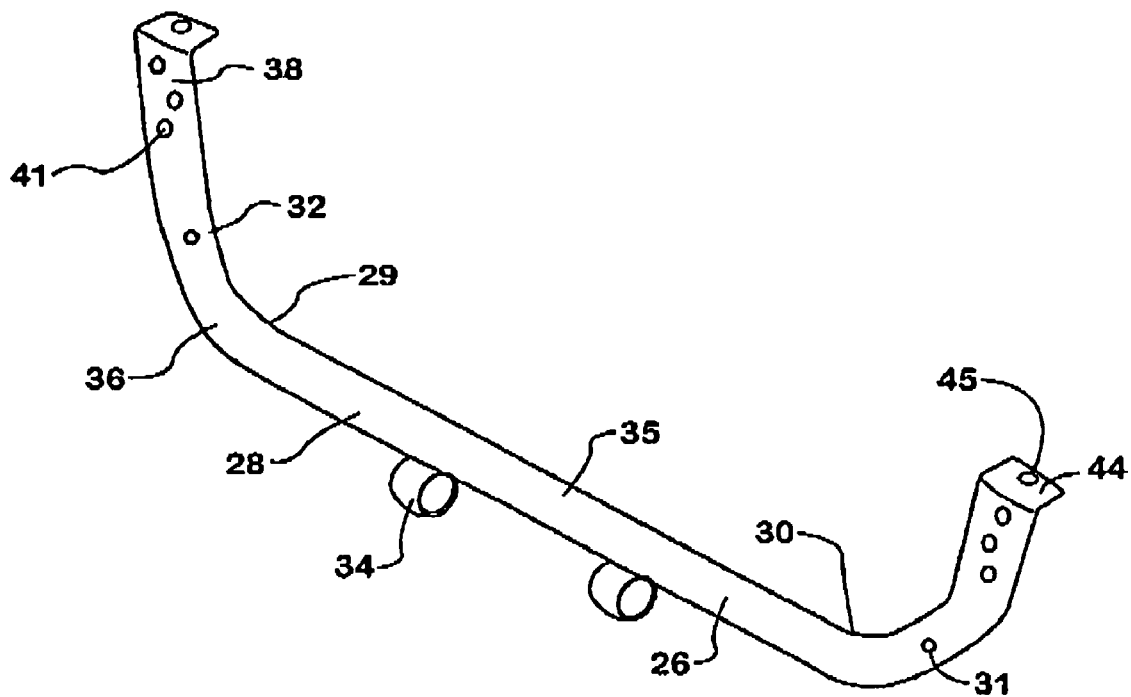
FIG. 2 is a perspective view of an embodiment of a hinge bar of the invention.

With reference to the Figures where like reference numerals refer to like structures, a large motor vehicle 10, such as a truck or school bus, has a hood 12 pivotally mounted to the vehicle frame 14 using a hinge assembly 18 for pivoting between respective closed and open positions. The hood 12 has left 23 and right 24 sides and a top 25. A front reinforcement assembly 20 fastens to the hood 12 and to the hinge assembly 18. The hinge assembly 18 also fastens to the vehicle frame 14.

Figure 4:
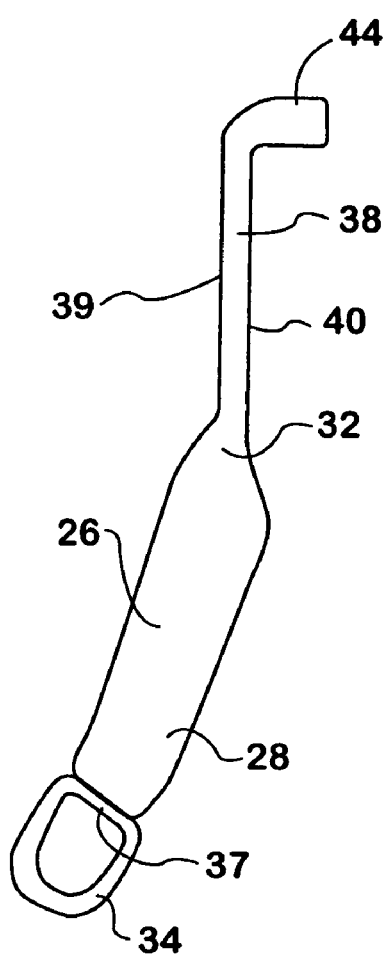
FIG. 4 is a side view of an embodiment of a hinge bar of the invention.

A hinge bar is one element of the hinge assembly 18. In the embodiment shown in FIGS. 2-7, hinge bar 26 has body 28 with opposite ends 29, 30 and a midsection 35. Body 28 is preferably tubular and can be substantially circular in cross-section. At least one ring 34 is located between the body midsection 35 and an end 29. Rings 34 project from one side of the body 28 and can be circular (FIG. 9) or partially circular, such as a D-ring (FIG. 4). The rings are mechanically mounted, welded or bonded to the body 28 or can be molded. If a D-ring 34 is used, the flatter end 37 abuts the body 28.

A curved end section 36 is located at each end 29, 30 of the body 28. The end section 36 preferably curves or tilts from the body 28 inwardly in a direction away from the rings 34, preferably to match the inner surface of the front reinforcement assembly 20, and more preferably so the hinge bar 26 is not seen through the grill opening.

An arm 32 extends from each end section 36. Arm 32 preferably curves or tilts inwardly in a direction away from the rings 34 and toward the rear of the motor vehicle, preferably to match the inner surface of the front reinforcement assembly 20, and more preferably so the hinge bar 26 is not seen through the grill opening. Arm 32 is preferably tubular and can be substantially circular in cross-section and can have holes 31 for receiving fasteners.

A hinge bar bracket 38 extends from the end of each arm 32 opposite the end section 36. The hinge bar bracket 38 has first 39 and second 40 surfaces and is flat on both the first 39 and second 40 surfaces. Bores 41 are located in the hinge bar bracket 38. A flange 44 can project from the end of the hinge bar bracket 38. Preferably, flange 44 is transverse to the hinge bar bracket 38 and has a torsion bar aperture 45.

Preferably, the hinge bar's body 28, end section 36, arm 32 and hinge bar bracket 38 are one unitary piece, such as molded steel, formed steel tubing, composite material, and the like, although the hinge bar can be assembled from individual parts, if desired. While the end section 36, arm 32 and hinge bar bracket 38 are shown in a particular direction, the curved section 36, arm 32 and hinge bar bracket 38 can be turned in different directions to better fit the design of the front end of the motor vehicle. The hinge bar bracket 38, for example, can face forward or sideways rather than facing rearward. The hinge bar 26 can have a textured outer surface 46 to assist with securing other structures to the hinge bar 26. The arms 32, for example, can have a textured surface 46 and a holes can be a flow drill thread hole, an extruded thread hole, and the like, to help secure a torsion bar mounting bracket 76.

Figure 6:
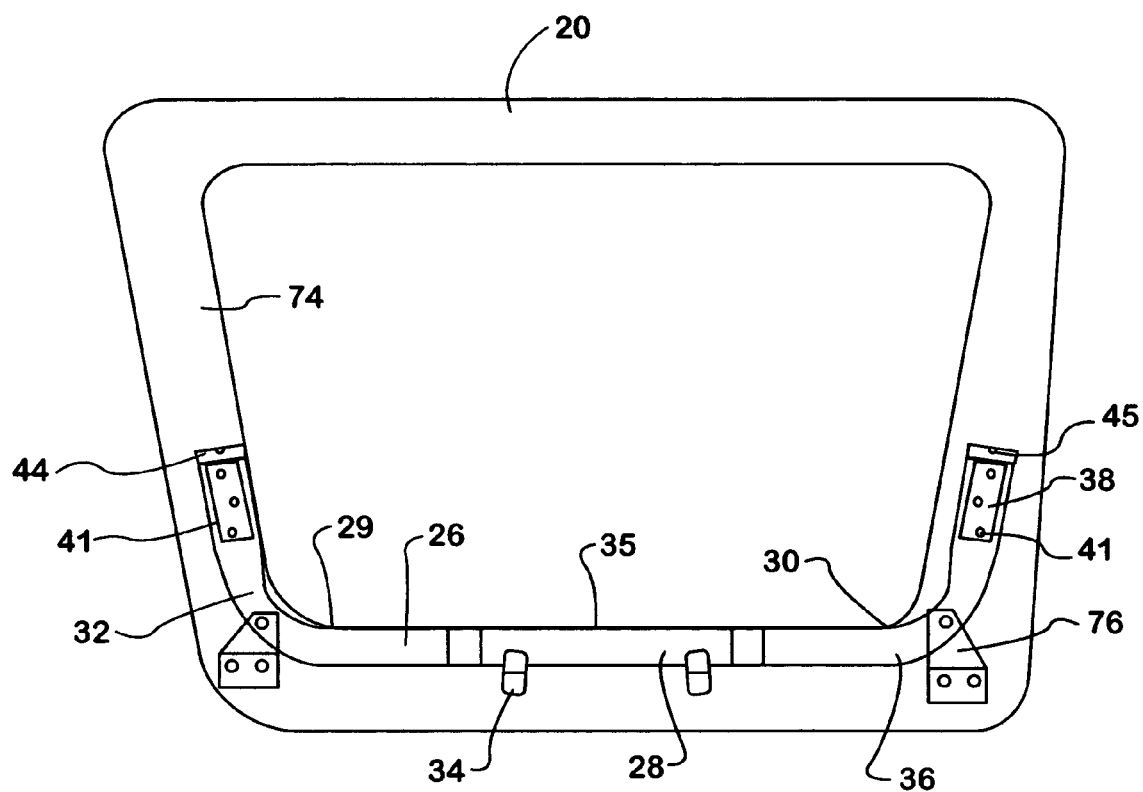
FIG. 6 is a rear view of an embodiment of a hinge bar of the invention installed to a hood assembly.
Figure 7:
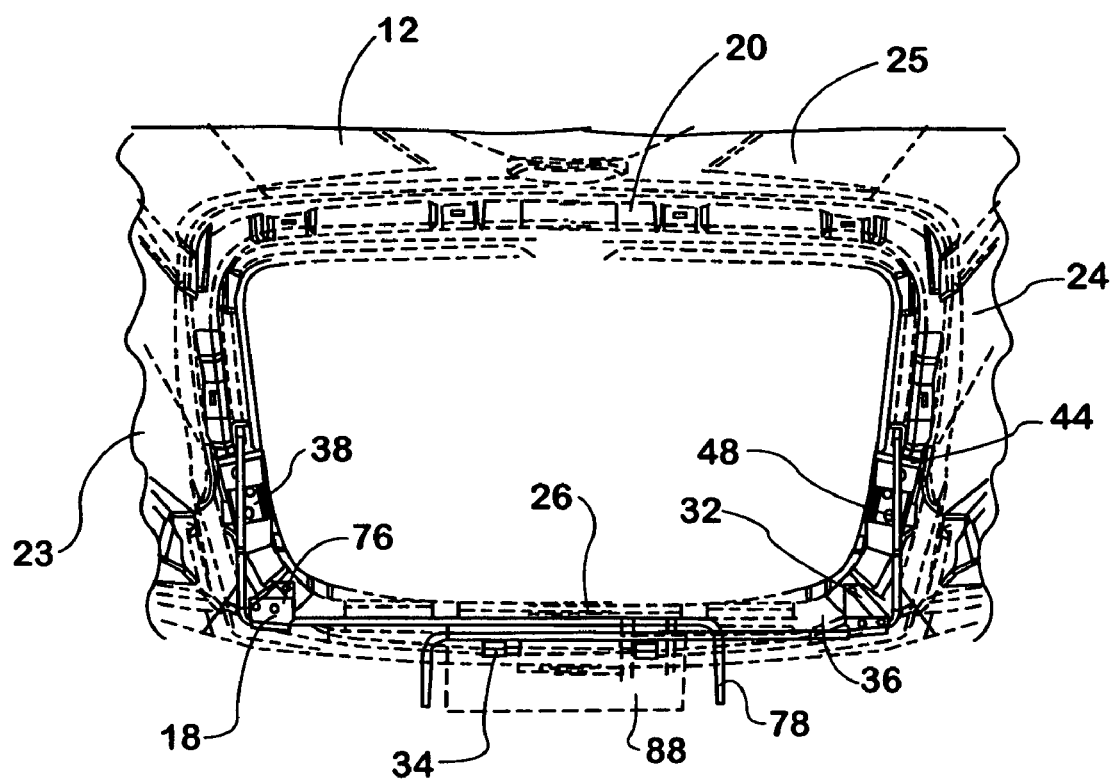
FIG. 7 is a partial rear view of an embodiment of a hinge bar of the invention with the hood hinge bar installed to a front hood reinforcement assembly and hood with the hinge in phantom.

Turning to FIGS. 5-7, hinge bar brackets 38 fasten to an inner surface 74 of the front reinforcement assembly 20 using fasteners 48, such as bolts or rivets. Flange 44 faces inward toward the rear of the hood 12. The hinge bar 26 fits against the curved inner surface of the front reinforcement assembly 20 with an end section 36 and an arm 32 at each lower corner. Isolators 50 can insert within rings 34 before fastening to the front reinforcement assembly 20. The front reinforcement assembly 20 fastens or bonds to the hood's top 25 and sides 23, 24.

The hood 12 shown in FIGS. 6 and 7, mounted to the front reinforcement assembly 20, includes the hinge bar 26, torsion bar mounting brackets 76 and torsion bars 78. A torsion bar mounting bracket 76, for example, mounts to each arm 32 with a fastener 48 extending into hole 31. Each torsion bar 78 extends though the torsion bar aperture 45 of the flange 44 and the torsion bar mounting bracket 76.

A hinge 88 pivotally mounts to the hinge bar 26 with pivot pins 89 inserted within the isolators 50 within the rings 34. The torsion bars 78 tuck within the hinge 88. The hinge 88 mounts to the vehicle frame assembly (not shown).

Figure 9:
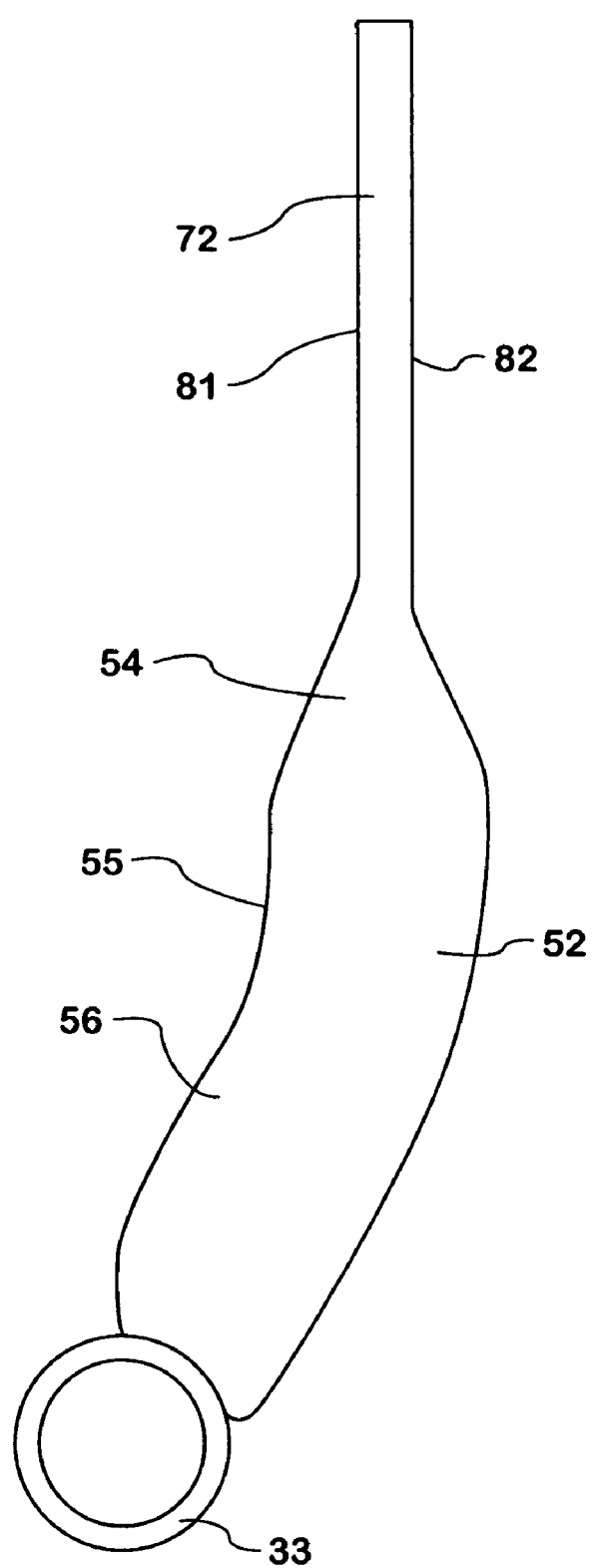
FIG. 9 is a side view of a second embodiment of a hinge bar of the invention.
Figure 8:
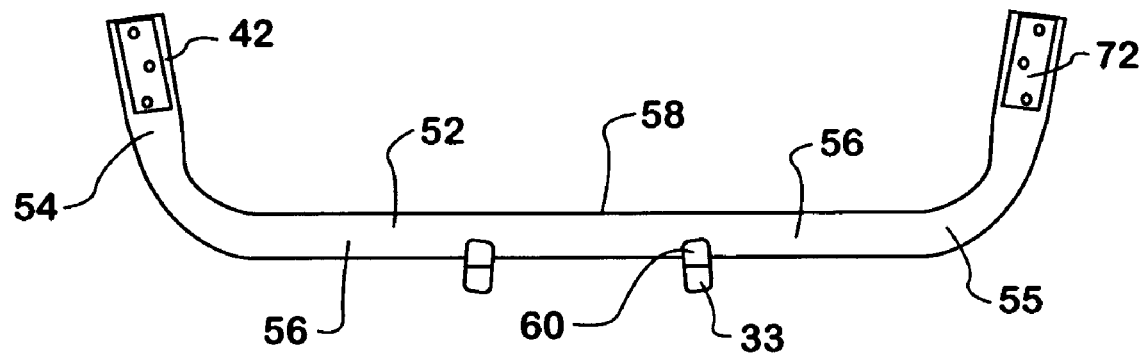
FIG. 8 is front plan view of a second embodiment of a hinge bar of the invention.

In the embodiment shown in FIGS. 8-9, hinge bar 52 is tubular with arms 54 curving upwardly and inwardly from end sections 55 located at the opposite ends of the body 56. Each arm 54 has a hinge bar bracket 72 extending from the arm 54 opposite the body 56. The hinge bar bracket 72 has a flat first side 81, and a second side 82 with a raised peripheral border 42. Rings 33 mount to a surface of the body 56 opposite the arms 54 between the body midsection 58 and the opposite ends. The body 56 can have a ring mount 60 projecting from the exterior surface for receiving a ring 33. Alternatively, the body 56 can inwardly curve to receive a ring 33.

Figure 10:
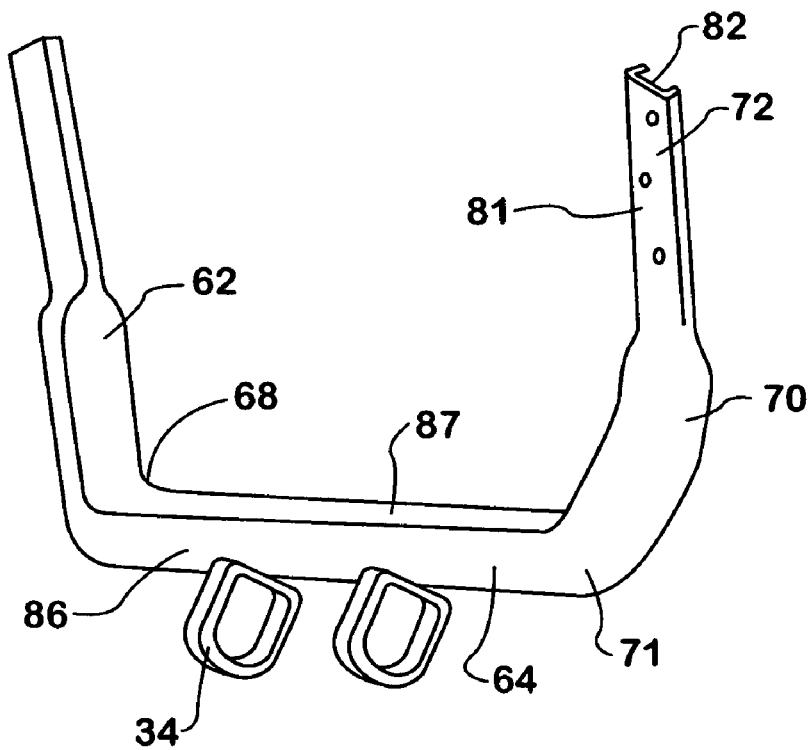
FIG. 10 is a perspective view of a third embodiment of a hinge bar of the invention.
Figure 11:
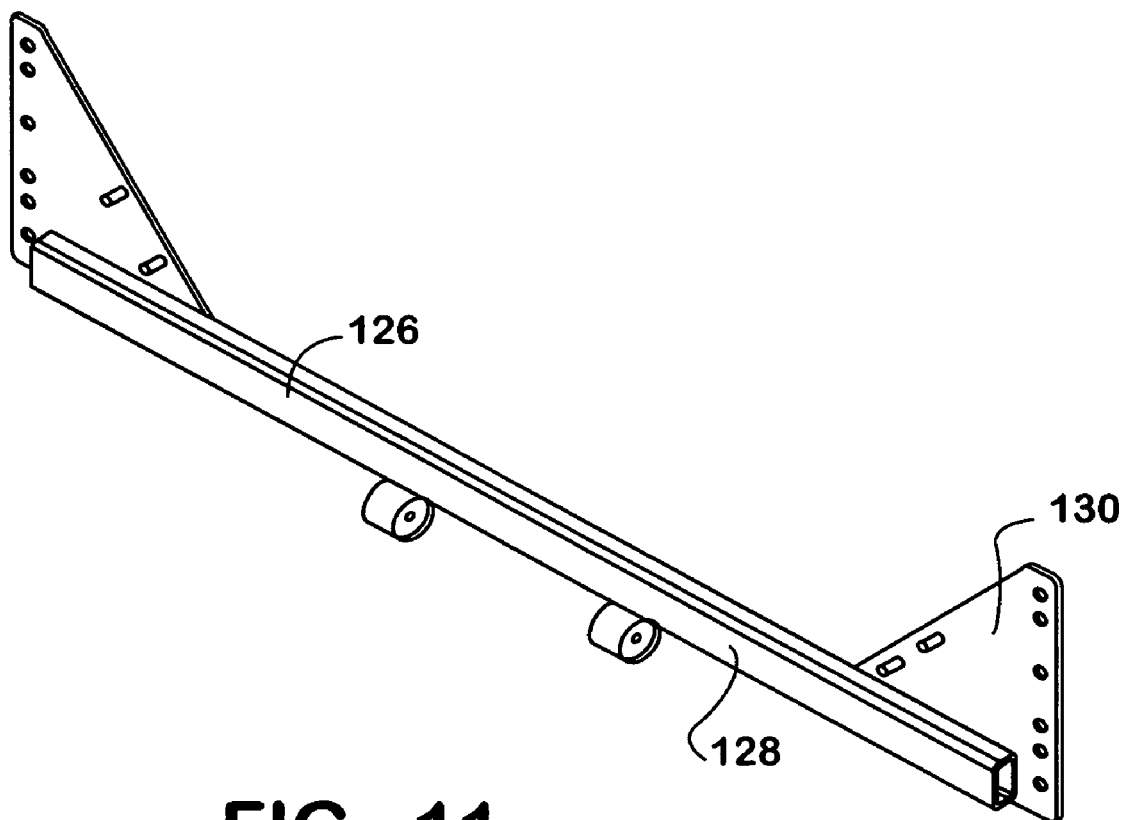
FIG. 11 is a front plan view of a prior art hinge bar.

In the embodiment shown in FIG. 10, the hinge bar 62 a body 64 with a curved first surface 86 and can have a straight second surface 87. Each end 68 of the body 62 has an end section 71 rising outwardly at a smaller angle than in the embodiments shown in FIGS. 2 and 8. An arm 70 extends from the end section 71 with the hinge bar bracket 72 extending from the arm 70 opposite the end section 71. D-rings 34 attach to the curved first surface 86.

The hinge bar of the invention has a number of advantages. The hinge bar easily fits to the front reinforcement assembly of a modern streamlined truck. The design is versatile, allowing the brackets, arms and end sections to be easily redesigned to change when the contours of the motor vehicle changes.

Another advantage is the hinge bar can support more parts of the hinge assembly, such as the torsion bars. The hinge bar has fewer parts that need to be assembled, thus reducing assembly time and cost.

While the invention is shown in only one of its forms, it is not thus limited but is susceptible to various changes and modifications without departing from the spirit and scope of the invention.

What is claimed is:

1. A hood hinge assembly for a large motor vehicle, comprising:
   a hinge bar comprising a body having a midsection and opposite ends, at least one ring projecting from one side of the body between the midsection and one of the opposite ends, a curved end section extending from each end of the body in a direction away from the ring, an arm extending from the end section, and a hinge bar bracket extending from the arm opposite the end section;
   a torsion bar mounting bracket mounted to each arm;
   a torsion bar engaging the torsion bar mounting bracket;
   a flange projecting from one end of the hinge bar bracket;
   a torsion bar aperture within the flange matingly engaging the torsion bar; and
   a hinge pivotally mounted to the ring and engaging the torsion bar.

2. The hood hinge assembly of claim 1, wherein the arm extends inwardly from the end section in a direction away from the rings.

3. A hood for a motor vehicle, comprising:
   a hinge bar comprising a body having a midsection and opposite ends, at least one ring projecting from one side of the body between the midsection and one of the opposite ends, a curved end section extending from each end of the body in a direction away from the ring, an arm extending from the end section, and a hinge bar bracket extending from the arm opposite the end section; and
   a front reinforcement assembly mounting to the hinge bar;
   a flange projecting from one end of the hinge bar bracket;
   a torsion bar mounting bracket mounted to each arm;
   a torsion bar engaging the torsion bar mounting bracket;
   a torsion bar aperture within the flange matingly engaging the torsion bar;
   a top attaching to the front hood reinforcement assembly;
   a right side attaching to the front hood reinforcement assembly;
   a left side attaching to the front hood reinforcement assembly opposite the right; and
   a hinge pivotally mounted to the ring and engaging the torsion bar.

4. The hood of claim 3, further comprising:
   a vehicle frame assembly mounted to the hinge.

5. The hood of claim 3, wherein the arm extends inwardly from the end section in a direction away from the rings.

* * * * *